Feb. 1, 1966   C. H. WATTS ETAL   3,231,946
APPARATUS FOR FORMING CERAMIC SHELL MOLDS
Filed Dec. 28, 1962   6 Sheets-Sheet 1

INVENTORS
Claude H. Watts
Arthur A. Shields
Harvey W. Krohn
BY Watts & Fisher
ATTORNEYS

United States Patent Office 3,231,946
Patented Feb. 1, 1966

3,231,946
APPARATUS FOR FORMING CERAMIC SHELL MOLDS
Claude H. Watts and Arthur A. Shields, Lyndhurst, and Harvey W. Krohn, Cleveland, Ohio, assignors to Precision Metalsmiths, Inc.
Filed Dec. 28, 1962, Ser. No. 248,076
14 Claims. (Cl. 22—9)

This invention relates generally to the art of investment casting, and more particularly to ceramic shell molding techniques of precision casting wherein shell molds suitable for casting metal are prepared by building up layers of refractory material around disposable patterns which are subsequently removed from the molds.

As is known to those familiar with the art of investment casting, there is a growing trend in the industry to use ceramic shell molds in place of the conventional, bulk investment molds. This development of ceramic shell molding techniques has been prompted by the advantages which shell molds offer in many applications. For example, as compared with conventional investment molds, shell molds are lighter and easier to handle, exhibit increased permeability and thermal shock resistance, provide for easier knock-out and clean-up after casting, do not require flasks, and generally provide greater flexibility in processing.

In general, ceramic shell molds are prepared using patterns which are replicas of the parts to be cast, including the necessary gates and risers, and which are formed of an expendable material, such as wax or a suitable synthetic resin. These patterns are attached to a sprue form to constitute what is commonly known as a "set-up" or "tree." The formation of a shell mold around the assembly of patterns is accomplished by dipping the set-up into a refractory slurry of controlled viscosity followed by directional draining to attain uniform coverage. After draining excess slurry from the set-up, the slurry coating is then sanded or stuccoed with coarser refractory particles, as by dipping the set-up into an air-fluidized bed of suitable refractory material. The result is a coat of ceramic material having refractory particles embedded in the surface. This coat is hardened, usually by air drying at room conditions.

After the first coat is sufficiently hard and dry, the steps of dipping, draining, stuccoing, and drying are repeated until a refractory shell having a sufficient thickness to resist the stresses occurring in subsequent operations has been built up around the patterns. The usual shell thickness is from ⅛ inch to about ½ inch, although thicker or thinner shells may be formed for special situations. The disposable patterns are subsequently removed from the shell mold and the mold prepared for the casting operation.

A preferred refractory slurry used for dipping consists essentially of a suspension of a fine refractory powder in a binder solution comprised mainly of colloidal silica sol and small amounts of an organic film-former, a wetting agent and a defoaming agent. The refractory powder usually is minus 100 mesh. Silicon dioxide, fused quartz, fused aluminum oxide, tabular alumina, and zircon (zirconium silicate) are among the materials more commonly used.

The stuccoing material is generally of much larger particle size than the refractory powder used in the slurry. Suitable refractory materials employed for stuccoing include granular zircon, fused silica, silica, various aluminum silicate grogs including millite, sillimanite, fused alumina, tabular aluminum, and similar materials.

In order to obtain a satisfactory shell for casting, it is necessary to form a substantially uniform, dense, void-free coating around the pattern assembly. Heretofore, it has been difficult to obtain such a shell when producing relatively complex shapes including unusual configurations of cored holes, slots, narrow passageways, and other openings. For example, in coating patterns which define relatively narrow cavities, it is difficult for the slurry to cover the innermost recesses of the cavities. If the viscosity of the slurry is reduced in an attempt to overcome this problem, the slurry usually is so thin that a discontinuous coating is formed on the pattern surface, resulting in rough surfaces and dirt inclusions in the finished casting. On the other hand, if the slurry is made thick enough to remain in the relatively small recesses, it is usually too thick satisfactorily to be forced into the recesses by conventional techniques. The problem of filling the pattern cavities is further complicated by the fact that each coat, after drying, tends to absorb moisture from the next dip, thereby causing the slurry to thicken to a point that it cannot run completely into the cavities.

Furthermore, when one dip coating has dried, many small voids may be left by escaping moisture and gases. When the next coating is applied, it will displace the air trapped in these small voids or pockets and a bubbling effect will take place which may tend to weaken the shell and also to block the complete filling of the pattern cavities. It has also been found that this trapped air will often collect and cause voids which result in the cast piece being scrapped.

In the past, it has been customary manually to handle the set-ups during the steps of dipping, draining, and stuccoing. Thus, when applying the slurry coatings, it has been necessary manually to turn the set-ups in various positions so that the slurry may flow into the pattern cavities. Similarly, in attempting to obtain uniform coverage, the set-ups must be carefully positioned subsequent to dipping in an effort to directionally drain excess slurry from the patterns. Because the set-ups have been handled manually, it has been difficult to obtain consistently satisfactory results. Furthermore, the handling of the set-ups is time-consuming and is not adapted to economical production operations.

An object of the present invention is to provide automatic apparatus which is particularly adapted to the production of ceramic shell molds.

A more specific object of the invention is to provide apparatus which facilitates the application of slurry coatings in the formation of ceramic shell molds.

Still another object of the invention is to provide apparatus for applying dense, void-free slurry coatings to pattern set-ups in a manner which obtains uniform coverage and which reduces the problems of filling intricate pattern cavities, passages, openings, and the like.

In general, the foregoing objects of the invention are attained and the disadvantages of the prior art practice overcome by novel and improved apparatus which, in its preferred form, operates automatically to place a pattern set-up in a tank containing a suitable refractory slurry. When the set-up has been placed in the slurry tank, the tank is closed and a vacuum is drawn, whereby dissolved and occluded air in the slurry is removed. The vacuum is continued for a predetermined period of time and air at atmospheric pressure is introduced into the tank so that the slurry is forced by air pressure into all slots, cavities and other difficult-to-fill recesses of the patterns.

After the vacuum treatment, the pattern set-up is removed from the tank and directionally drained. In the preferred operation of the apparatus, this draining of the excess slurry is facilitated by rotating the set-ups. The set-up then may be stuccoed in the usual manner and the slurry coating allowed to harden. Each subsequent slurry coating may be applied in the same manner until a shell of the desired thickness has been built up.

The vacuum treatment of the slurry substantially prevents the detrimental occurrence of air bubbles on the surface of the patterns and thus assures that the slurry will uniformly coat and fill the intricate pattern details. A concomitant advantage is that dense refractory coatings are produced which are substantially free of voids that are conventionally formed by escaping gases. Consequently, when subsequent slurry coatings are applied, they will be free of air bubbles heretofore created by escaping air trapped in the voids of the previous coating.

In use it has been found that the apparatus makes it possible consistently to produce satisfactory shells using complex pattern shapes having intricate surface detail. Furthermore, as will hereinafter be made more apparent, the apparatus lends itself to automated production line procedures for dipping, draining and stuccoing the pattern assemblies.

Other objects and advantages of the invention will become apparent from the following detailed description when taken in conjunction with the accompanying drawings.

In the drawings:

FIGURE 18 is a view diagrammatically illustrating a preferred control system for the apparatus of the invention;

Referring now to the drawings, and to FIGS. 1, 6, 9 and 12 in particular, the apapratus of the invention is shown to comprise a framework 30 formed of suitable structural members. The framework 30 supports a slurry tank 31 and a vertically reciprocal carriage 32 above the tank. As will hereinafter be described in detail, the carriage 32 is operable to move a pattern set-up into the tank 31 which may be placed under vacuum, and subsequently to rotate the set-up after it has been partially withdrawn from the tank in order to facilitate proper draining.

In the illustrated construction, the slurry tank 31 is supported by a ring 33 which is welded to the outside of the tank wall. This ring is secured to the ends of upstanding frame members 34. If desired, a stiffening ring 32a may be provided around the upper end portion of the tank.

The carriage supporting portion of the framework 30 is shown to include a pair of spaced, vertical channels 35. The upper ends of these channel members 35 may be connected by an upper frame 36. The chanel members also are shown as being connected by an intermediate frame construction 37 which extends rearwardly from the channel members and is supported by members 38. As shown most clearly in FIG. 12, the intermediate frame 37 includes a transversely extending cylinder support plate 39. A main control box 40 is secured to the framework 30 above the cylinder support plate 39.

Figures 6, 7, 8:
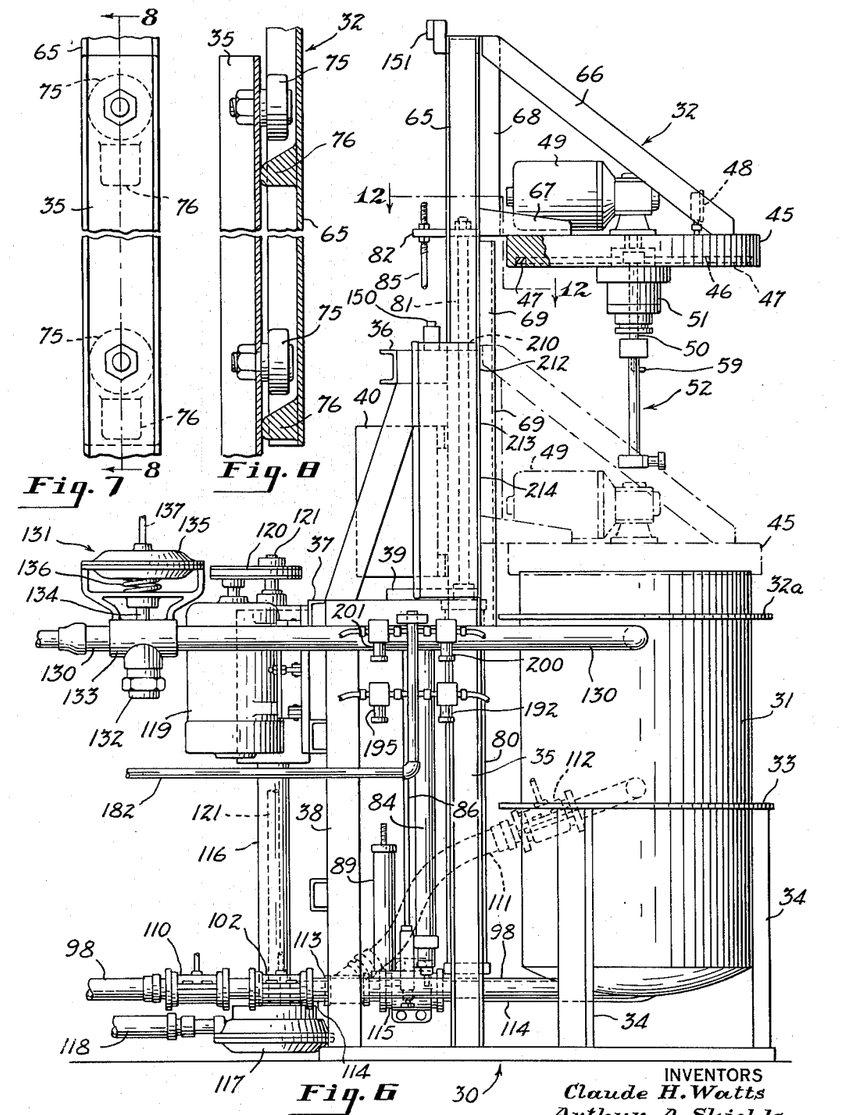
FIGURE 6 is a side elevational view of the apparatus.
FIGURE 7 is a fragmentary view of a portion of the apparatus shown in FIG. 6.
FIGURE 8 is a cross-sectional view taken on the line 8—8 of FIG. 7.

The carriage structure 32 includes a cover 45 for the slurry tank 31. As shown in FIG. 6, the lower surface of the cover 45 is provided with a groove 46 in which is seated an annular sealing ring 47. In use, the cover 45 is engaged over the open upper end of the slurry tank 31 in sealed relationship therewith so that a vacuum can be drawn in the tank. Reference numeral 48 generally designates a vacuum gauge which may be mounted on the cover 45.

Figure 13:
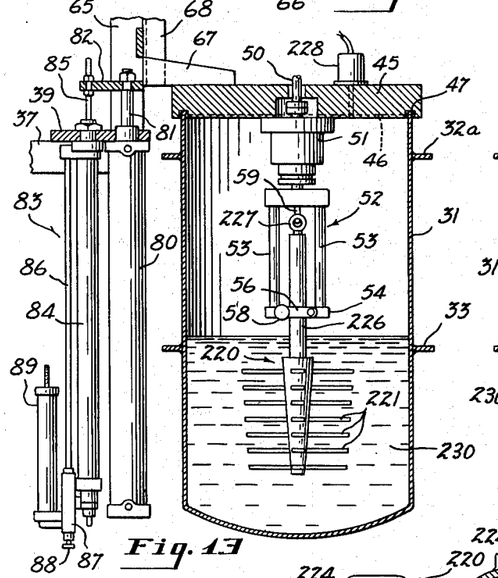
FIGURE 13 is a fragmentary view illustrating the apparatus in an operative position in which a typical pattern set-up is immersed in a tank of suitable refractory slurry.

A suitable motor 49 is provided on the cover 45 for rotating the pattern set-up after the vacuum treatment of the slurry in the tank 31. The motor is drivingly connected to a vertical shaft 50 which extends through the cover and is journaled in the housing 51. A pattern set-up clamp or fixture 52 is connected to the lower end of the shaft 50. As shown most clearly in FIGS. 13–15, the fixture 52 includes a pair of depending bars 53 which support a bracket 54. The bracket 54 includes a recess 55 adapted to receive a portion of the pattern set-up, and a clamping plate 56 is connected to the bracket in position to lock a portion of the pattern set-up in the recess 55. In the illustrated embodiment, one end of the plate 56 is pivotally connected to the bracket by a member 57 and the other end of the bracket is provided with a threaded member 58 which is adapted to be engaged in a slot in the plate. The preferred construction of the fixture 52 is also shown to include a hook 59 which is located above the bracket 54.

Referring again to FIGS. 1, 6 and 12, the structure of the carriage 32 is shown further to include a pair of oppositely facing channels 65 which are suitably connected to form a rigid carriage frame assembly. The cover 45 is connected to an intermediate portion of this frame assembly by downwardly angled braces 66 which extend from the upper end of the frame and by rearwardly extending members 67. These members 67 are secured to vertical bars 68 which also form a part of the carriage frame assembly. A cover plate 69 may be secured to the carriage channels 65 by means of spacer blocks 70 so as to extend across the carriage frame below the tank cover 45.

The carriage 32 is supported for reciprocal movement on the frame 30 by vertically spaced rollers 75. These rollers 75 are rotatably connected to the vertical frame channels 35 and are rollingly engaged within the carriage channels 65. Referring particularly to FIGS. 7 and 8, it will be seen that lateral movement of the carriage 32 is prevented by vertically spaced shoes 76. These shoes 76 are rigidly connected within the carriage channels 65 and slidably engage the surfaces of the frame channels 35.

In the preferred construction of the invention, movement is imparted to the carriage 32 by an air cylinder 80. The cylinder depends from the cylinder mounting plate 39 of the frame 30 and has its piston rod 81 secured to a carriage crosshead plate 82. As shown most clearly in FIG. 12, the carriage crosshead plate 82 is secured between the carriage channels 65. In order to obtain smooth and accurate movement of the carriage 32, a hydraulic control mechanism 83 (FIG. 13) also is preferably provided in conjunction with the main air cylinder 80. This control mechanism is of conventional construction and includes a checking cylinder 84 which depends from the cylinder mounting plate and has its piston rod 85 connected to the carriage crosshead 82. The piston (not shown) of the checking cylinder 84 includes a one-way valve which permits the hydraulic fluid to flow freely through the piston when it is forced to the bottom of the cylinder. A liquid transfer tube 86 is in open communication with the top of the checking cylinder 84 and communicates with the bottom of the cylinder through an adjustable needle valve assembly mounted in the housing 87.

When the carriage assembly 32 is moved upwardly to pull the control piston rod 85 out of the checking cylinder 84, liquid is forced from the top of the cylinder through the transfer tube 86 and the needle valve assembly into the bottom of the cylinder 84. The rate of flow may be controlled accurately by the adjustment screw 88 which controls the size of the passage through the needle valve. The control mechanism also is shown to include a spring-loaded reservoir cylinder 89 which receives the volume of liquid displaced from the cylinder 84 during downward movement of the piston rod 85. This displaced liquid is returned to the main cylinder 84 on the upward piston stroke.

According to the preferred operation of the apparatus, the refractory slurry is circulated through the tank 31 except during those intervals when the tank has been closed and a vacuum drawn. To this end, there is preferably provided a slurry reservoir 95. As shown most clearly in FIGS. 9 and 10, a rotary slurry pump 96 is mounted on the bottom of the reservoir 95 and a conduit 98 is connected between the outlet 97 of the pump and the bottom of the tank 31. The pump 96 is actuated to pump the slurry from the reservoir 95 into the tank 31 by a motor 99 which is mounted on top of the reservoir. As shown, the motor 99 is drivingly connected by a belt 100 to a vertical pump shaft 101 which extends downwardly through the reservoir.

Figures 9, 10, 11:
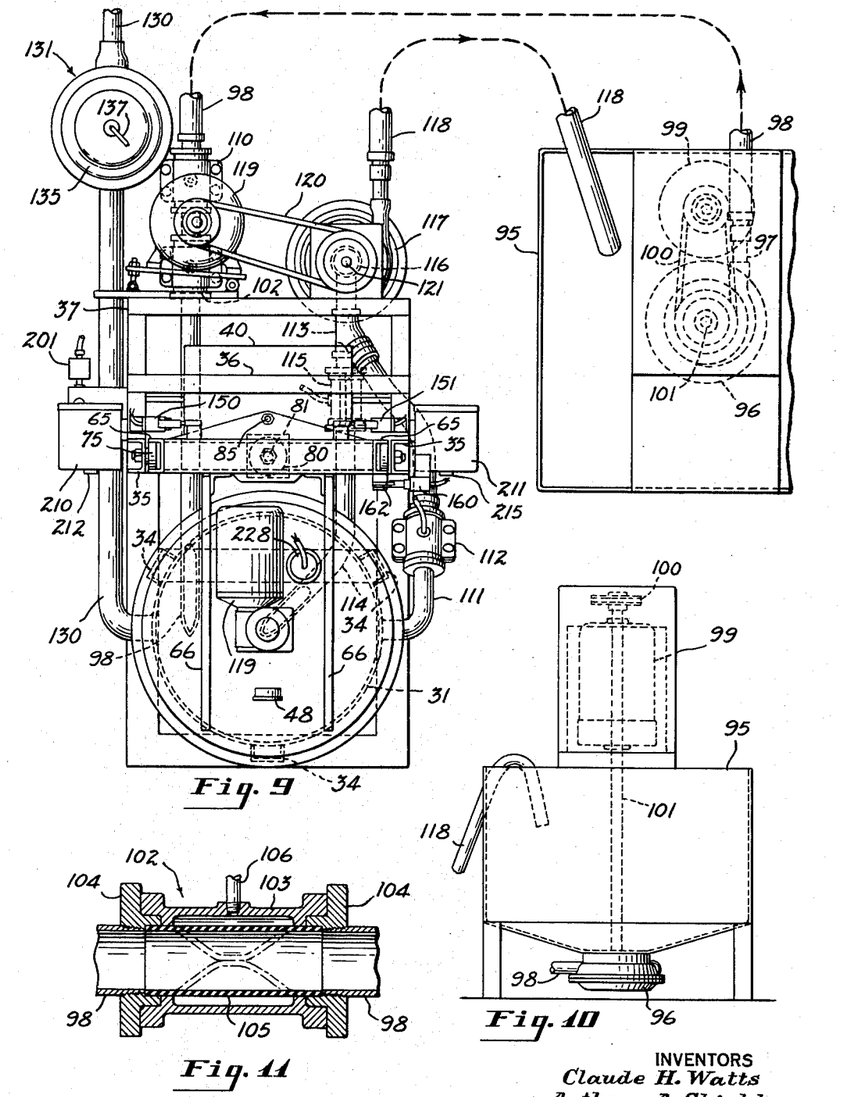
FIGURE 9 is a top plan view taken on the line 9—9 of FIG. 1 and shows a slurry reservoir tank which forms a part of the apparatus.
FIGURE 10 is an elevational view of the slurry reservoir tank.
FIGURE 11 is a cross-sectional view of a slurry shut-off valve.
Figure 12:
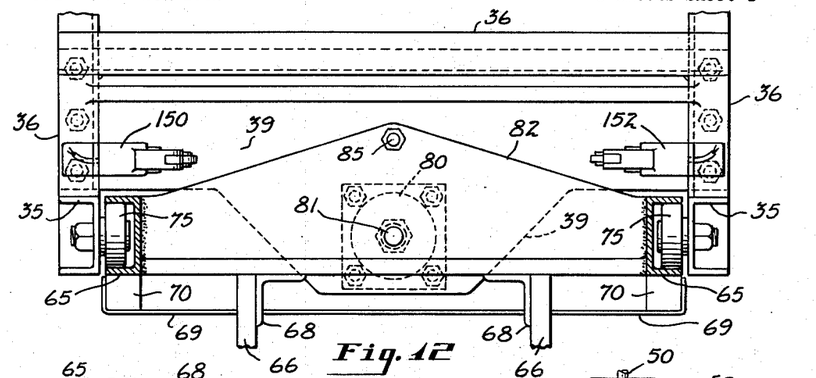
FIGURE 12 is a view taken on the line 12—12 of FIG. 6.

A slurry valve 102 is provided in the conduit 98 for shutting off the supply of refractory slurry prior to producing a vacuum in the slurry tank. This slurry valve 102 may be of conventional construction and is shown in FIG. 11 to include a casing 103 and end plates 104 which are adapted to receive the connecting portions of the conduit 98. A flexible sleeve 105 of abrasion-resistant material is mounted within the casing 103. By introducing air under pressure into the casing through the pipe 106, the flexible sleeve 105 may be constricted, as illustrated in FIG. 11 by broken lines, thereby shutting off the flow of slurry through the valve. It will be apparent to those skilled in the art that other suitable valve constructions which are resistant to the abrasive slurry may be used.

A throttle valve 110 is preferably provided in the conduit 98 upstream from the slurry shut-off valve 102 for the purpose of controlling the rate of slurry flow from the reservoir into the slurry tank 31. The valve 110 may be identical in construction to the valve 102 and operated by creating sufficient pressure in the valve casing to distort the flexible sleeve to partially restrict the slurry flow. Thus, by controlling the air pressure within the casing, the size of the flow passage defined by the flexible sleeve can be accurately determined.

An overflow conduit 111 is connected to the side of the tank 31 in order to maintain a substantially constant depth of slurry in the tank. A slurry shut-off valve 112 is preferably provided in the conduit 111 in order to prevent slurry from being drawn into the tank when a vacuum is produced. The overflow conduit 111 is connected by a suitable fitting 113 to an exhaust conduit 114 which leads from the bottom of the tank 31. The exhaust conduit 114 also is provided with a slurry cut-off valve 115 which is normally maintained closed and is opened only to drain the slurry tank.

The overflow conduit 111 and the exhaust conduit 114 are jointly connected by the fitting 113 to a standpipe 116 which is in turn connected to the inlet of a rotary slurry pump 117. This slurry pump 117 serves to pump the slurry through a conduit 118 back into the reservoir 95. As shown in FIGS. 6 and 9, the pump 117 is driven by a motor 119 which is connected to the frame portion 37. The motor 119 is drivingly connected by a belt 120 to the vertical pump shaft 121 which extends downwardly through the standpipe 116.

A vacuum line 130 also is connected into the side of the slurry tank 31 at a point which is spaced above the opening of the overflow conduit 111 and to a suitable vacuum pump (not shown). Referring specifically to FIG. 6, it will be seen that a spring-loaded valve 131 is provided in the vacuum line 130 for the purpose of opening the line to atmospheric pressure and thereby breaking the vacuum in the slurry tank 31. The illustrated construction of the vacuum valve 131 includes a normally open air inlet 132 which can be closed by a suitable valve (not shown) within the housing 133. The stem 134 of the valve extends through the valve housing 133 into operative connection with a flexible diaphragm (not shown) which is secured within a diaphragm housing 135. A spring 136 serves to bias the valve to its normally open position and an air inlet pipe 137 is connected to the housing 135 for introducing air under pressure above the diaphragm. As air is introduced into the diaphragm housing 135, the diaphragm is forced downwardly to seat the valve against the action of the spring 136 and thereby close the air inlet 132. When the supply of air to the diaphragm housing 135 is shut off, the action of the spring 136 opens the valve so that air at atmospheric pressure is admitted through the air inlet 132 and the conduit 130 to the tank 31.

Figures 1, 2, 3, 4, 5:
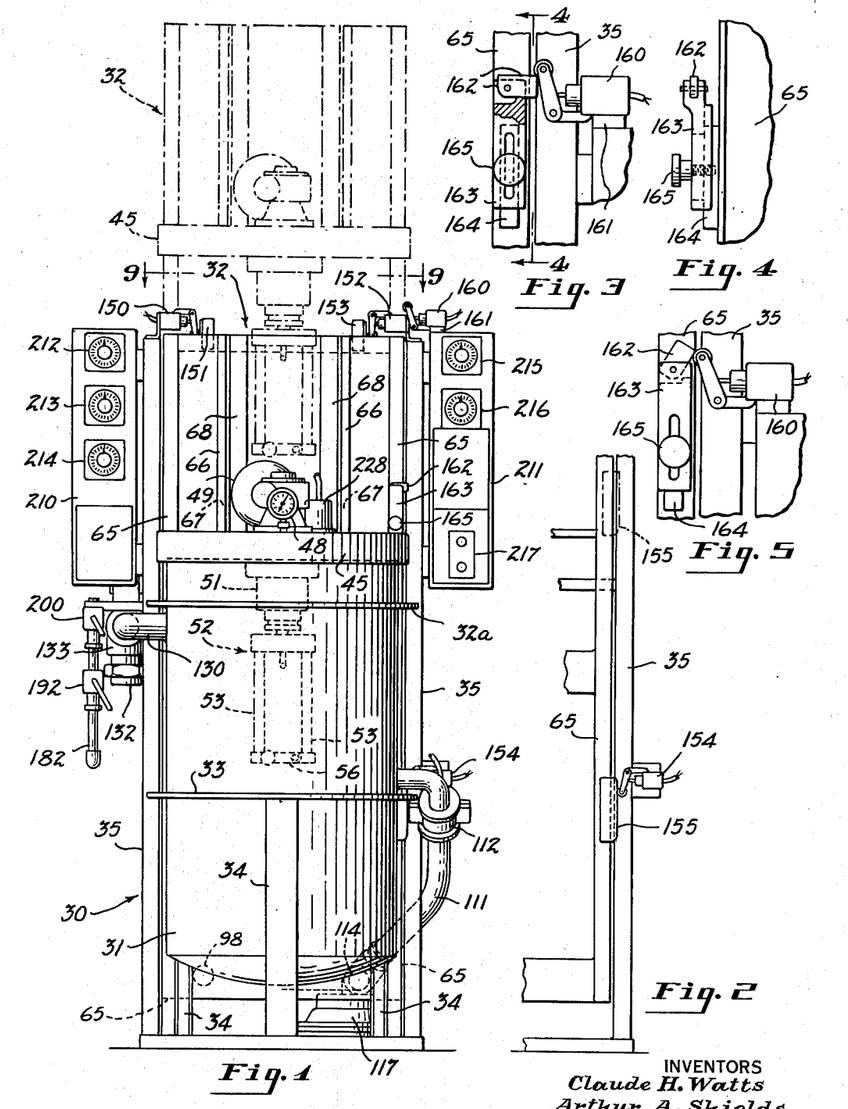
FIGURE 1 is a front elevational view of the preferred embodiment of the apparatus comprising the present invention.
FIGURE 2 is a fragmentary view of a portion of the apparatus shown in FIG. 1.
FIGURE 3 is a fragmentary view of another portion of the apparatus.
FIGURE 4 is a view taken on the line 4—4 of FIG. 3.
FIGURE 5 is a fragmentary view similar to FIG. 3, but showing the apparatus in reverse operation.
Figure 4B:
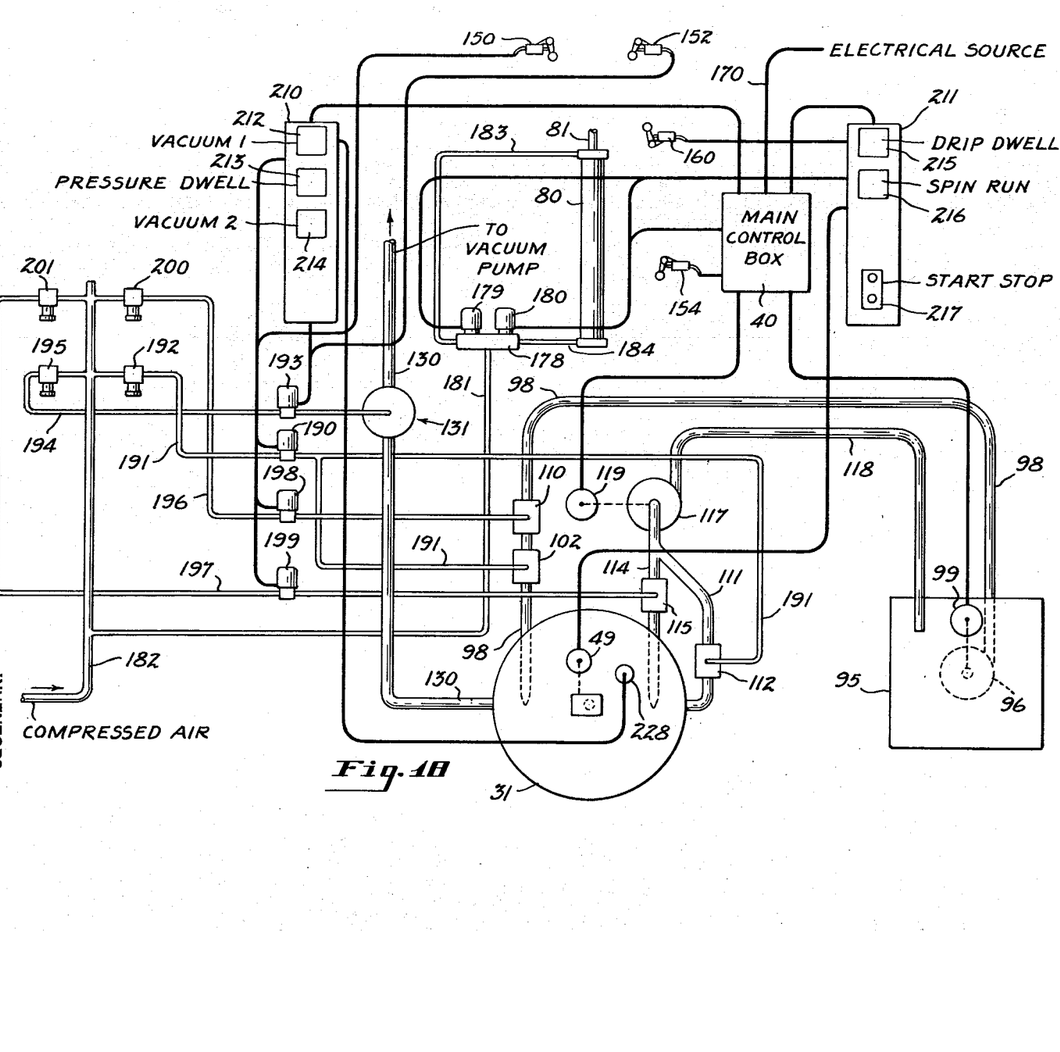

Suitable limit switches are provided for controlling the various operations of the apparatus in a manner which will hereinafter be described in detail. As shown in FIG. 1, a limit switch 150 is mounted on one of the vertical channel members 35 of the frame 30. This limit switch acts to close the slurry valves 102 and 112 when the carriage 32 has been moved to its down position and the slurry tank has been closed by the cover 45. According to the illustrated arrangement, the limit switch 150 is actuated by a control block 151 which is connected to the top of the carriage. Another limit switch 152 is mounted on the other frame channel 35 and serves to actuate the vacuum valve 131 when the carriage is in its down position. This limit switch is also actuated by a suitable block 153 connected to the top of the carriage.

A limit switch 154 is provided for shutting off the slurry pumps 96 and 117 when the slurry tank 131 has been closed. As shown in FIG. 2, this limit switch 154 is mounted on one of the frame channels 35. An actuating shoe 155 is connected to the adjacent carriage channel 65 in position to actuate the switch and stop the slurry pumps when the carriage is in the illustrated down position. After the pattern assembly has been dipped in the slurry and the carriage is moved upwardly to open the slurry tank, the shoe 155 passes out of contact with the switch 154 so that the pumps are again actuated to circulate the slurry through the tank.

The operation of the spin motor 49 is controlled by a limit switch 160 which is connected to the top of the frame 30 by a bracket 161. Referring specifically to FIGS. 3, 4 and 5, it will be seen that the switch 160 is adapted to be actuated during upward movement of the carriage 32 by a shoe 162 which is pivotally connected within a bifurcated upper end of a channel member 163. The channel member 163 is vertically adjustable on a guide 164 which is secured to the carriage channel 65, and a clamping screw 165 is provided for holding the channel member 163 in its adjusted position. When the carriage 32 is moved upwardly, the shoe 162 will contact the switch 160, as shown in FIG. 3, to initiate actuation of the motor 49. During downward travel of the carriage, the shoe will pivot out of contact with the limit switch, as shown in FIG. 5.

Reference is now made to FIG. 18 which diagrammatically illustrates a preferred control system for the apparatus, including the fluid ducts and suitable electric conduits which are represented by heavy lines. The electrical conduits will be understood to contain one or more circuits which are electrically connected to the various valves, switches, and control boxes in a manner which will be readily apparent to those skilled in the art in view of the following description.

As shown in FIG. 18, a two-way fluid valve 178, which is controlled by solenoid operated pilot valves 179 and 180, is provided for admitting air to the main cylinder 80. Air under pressure is supplied to the valve 178 through a branch conduit 181 which connects to a main inlet air line 182. The valve 178 is connected to the top of the main cylinder 80 through a fluid conduit 183 and to the bottom of the cylinder by a fluid conduit 184. When the apparatus is actuated to initiate a dipping operation, the pilot valve 179 is operated to shift the valve 178 and admit air to the top of the main cylinder 80, thereby causing downward movement of the carriage 32. At the end of the dipping operation, the valve 178 is actuated by the pilot valve 180 to admit air into the bottom of the main cylinder and affect reverse movement of the carriage.

As generally described above, the limit switches 150, 152, 154 are actuated by the carriage when it has been moved to close the slurry tank 31. The limit switch 150 is in operative circuit relation with a solenoid-operated valve 190 which is disposed in a fluid conduit 191. The conduit 191 is connected between the main inlet air line 182 and each of the slurry valves 102 and 112. When the limit switch 150 is actuated, the valve 190 is opened to admit air to the slurry valves 102 and 112 and thereby close the slurry conduits 98 and 111. Preferably, the fluid conduit 191 is provided with a pressure regulator 192 in order to control the air pressure in the slurry valves.

The limit switch 152 is electrically connected to a normally closed, solenoid operated valve 193 which is in a fluid conduit 194. The fluid conduit 194 is connected between the main inlet air line 182 and the diaphragm housing of the vacuum valve 131. As shown, a pressure regulator valve 195 also may be disposed in the conduit 194. When the limit switch 152 is actuated by the carriage 32, the valve 193 is opened to admit air under pressure into the diaphragm housing of the vacuum valve 131. As explained above, the air under pressure which is admitted to the vacuum valve causes the air inlet of the valve to be closed so that a vacuum can be produced in a slurry tank by a suitable vacuum pump (not shown). The limit switch 154 is connected through the main control box 40 to the slurry pump motors 99 and 119 so that the slurry pumps will be shut off at approximately the same time the slurry valves are closed and the valve 131 is actuated to affect a vacuum in the slurry tank 31.

The throttle valve 110 and the slurry valve 115 in the drain conduit 114 for the slurry tank are respectively connected to the main air line 182 by branch lines 196 and 197. Solenoid operated valves are in circuit relation with the main control box 40. As generally described above, the valve 198 is normally open during operation of the apparatus so that throttle valve 110 may regulate the flow of slurry into the tank 31 when the shut-off valve 102 is open. A pressure regulator 200 also is provided in the air line 196 in order to obtain the desired pressure in the throttle valve 110. The solenoid valve 199 is normally open and is closed only when it is desired to drain the slurry tank. As shown, the pressure in the air line 197 is controlled by another pressure regulator 201.

The preferred control system is further shown to include a pair of timer boxes 210 and 211 which may be connected to the frame members 35. Connected within the timer box 210 are a first vacuum timer 212, a pressure dwell timer 213, and a second vacuum timer 214. The timer box 211 includes a drip dwell timer 215, a spin timer 216 and a start-stop switch 217. As will be made more apparent, the various timers are disposed in circuit relation with the limit switches and solenoid valves to provide an automatic cycle of operations wherein the vacuum timer 212 controls the time of a first vacuum treatment of the slurry. The pressure dwell timer 213 and the second vacuum timer 214 act in conjunction to provide for an optional, second vacuum treatment before the pattern assembly is removed from the slurry. When the pattern assembly has been removed from the slurry after dipping, the timer 215 is activated to allow the assembly to directionally drain for a predetermined time, and then the timer 216 is actuated to operate the spin motor 49.

Before describing the operation of the apparatus in detail, reference is made to FIGS. 13, 14, 16 and 17 which, as previously noted, illustrate a typical pattern set-up 220 suitable for use in forming a ceramic shell mold. As shown, the set-up 220 consists of a plurality of expandible patterns 221, each of which includes a longitudinal slot 222 and transverse openings 223. The gating 224 of the patterns is attached to a center sprue form 225 which also may be formed of an expendible material. Those familiar with the art of lost pattern precision casting, and particularly with shell molding techniques, will understand that, in forming a ceramic shell mold around the illustrated set-up, it is necessary to completely fill the narrow slots 222 and to core the openings 223 so that, when the patterns are subsequently removed from the mold, pattern cavities are formed which define the exact shapes of the desired castings.

In accomplishing the foregoing by means of the present invention, the pattern set-up 220 is connected to the fixture 52 by a rod 226 which has one end suitably attached to the sprue form 225 and an opposite end which preferably is provided with a hook 227. As shown, an intermediate portion of the rod 226 is secured in the bracket recess 55 by the clamping plate 56, while the hook 227 is connected to the fixture hook 59. With the pattern set-up secured to the fixture 52, the start-stop switch 217 is closed to activate the pilot valve 179 of the valve 178 so that the carriage 32 is moved from the solid line position illustrated in FIG. 6 to the down position shown in FIGS. 1 and 13. When the carriage 32 has been moved to the down position to close the tank 31 and immerse the set-up 220 in the slurry 230 (FIG. 13), the limit switches 150 and 152 are contacted to initiate the vacuum in the tank 31 and to close the slurry valves 102 and 112. At substantially the same time, the limit switch 154 is contacted to stop the slurry pump motors 99 and 119.

A vacuum switch 228 is mounted on the cover 49 and is in circuit relation with the vacuum timer 212. After the desired vacuum has been produced in the tank 31, the vacuum switch 228 is activated to start the timer 212. This timer is pre-set to hold the vacuum for a period calculated to clear air bubbles from the slurry around the patterns. At the end of the vacuum period, the solenoid valve 193 is closed to admit ambient air through the vacuum valve 131 into the slurry tank. In this manner, the slurry is forced by air pressure into all undercuts, internal slots, holes and other difficult to fill recesses of the patterns.

In the next operation, either the pilot valve 180 may be activated to start return movement of the carriage 32 or a second vacuum treatment is initiated. In the latter instance, the pressure dwell timer 213 is automatically started and this timer serves to hold the vacuum valve 131 open for a sufficient time to assure that the pressure in the slurry tank is at atmospheric pressure. Thereafter, the vacuum valve is closed and the timer 214 is started to effect the second vacuum treatment. At the end of this optional vacuum treatment, the pilot valve 180 is activated to start the carriage 32.

Figure 14:
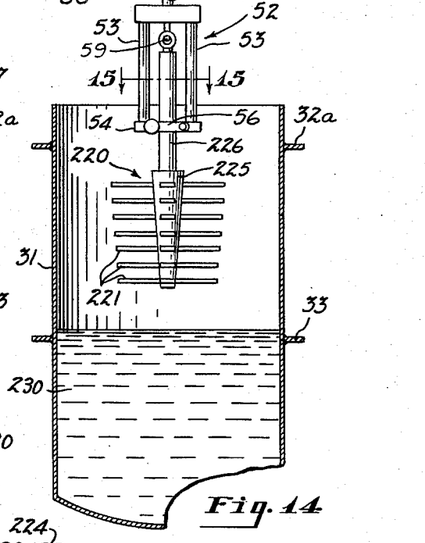
FIGURE 14 is a fragmentary view illustrating the pattern set-up when it has been partially withdrawn from the slurry tank for draining.
Figure 15:
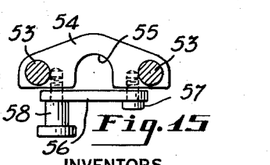
FIGURE 15 is a view taken on the line 15—15 of FIG. 14.
Figures 16, 17:
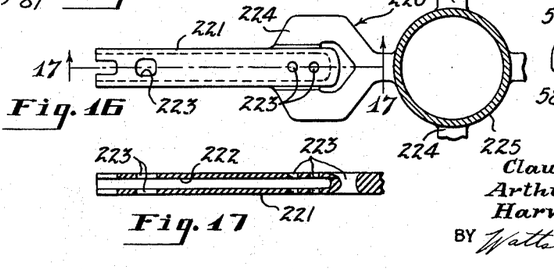
FIGURE 16 is a fragmentary view, partially in cross-section, of the typical pattern set-up shown in FIGS. 13 and 14.
FIGURE 17 is a cross-sectional view taken on the line 17—17 of FIG. 16.

The carriage 32 is moved upwardly by the main cylinder 80 to the position shown in FIG. 14 wherein the set-up 220 is removed from the slurry and is in the upper portion of the slurry tank. Thereupon the limit switch 160 is contacted to close the main cylinder valve 178 and to start the drip dwell timer 211. The timer 211 is set to allow sufficient time for directional draining of excess slurry from the set-up. In this way, substantially uniform external coverage of the patterns is obtained without disturbing the ceramic slurry forming the internal cores.

At the end of the drip dwell period, the spin motor 49 and the spin timer 216 are actuated. The set-up 220 is rotated by the motor 49 a sufficient length of time, as determined by the setting of the timer 216, to effect draining of excess slurry from the pattern cavities and recesses. The cycle of operations is then completed by actuation of the pilot valve 180 which causes the main cylinder 80 to return the carriage 32 to its up position.

Subsequent to the above-described operations, stuccoing material is applied to the slurry coating, as by immersing the set-up in an air-fluidized refractory bed, and the coating allowed to harden. Additional coatings may be applied in the same manner, stuccoed and allowed to harden until a ceramic shell of the desired thickness has been produced. It will be understood that the vacuum treatment of the slurry may be effected during each dip coating step in building up the shell or, depending upon the pattern configuration and the viscosity of the slurry, during only selected applications of the slurry to the patterns.

It will thus be apparent that the described embodiment of the invention provides a novel apparatus for applying slurry to pattern assemblies in formation of ceramic shell molds. The operation of the apparatus can be precisely controlled to coat the patterns uniformly and fill the recesses of intricate pattern shapes. Further, it is possible consistently to obtain satisfactory shells so that the occurrence of scrap castings, as have frequently been produced by improperly formed shells made by conventional hand methods, is materially reduced.

Another important aspect of the invention is the provision of automatic production line equipment and techniques for completely forming ceramic shell molds. To this end, there is diagrammatically illustrated in FIG. 19 an apparatus 250 which generally comprises a suitable conveyor 251 adapted to carry a plurality of pattern set-ups. The conveyor is actuated by a suitable drive mechanism (not shown) to move the several pattern set-ups in step-wise fashion between work stations 252 and 253.

Figure 19:
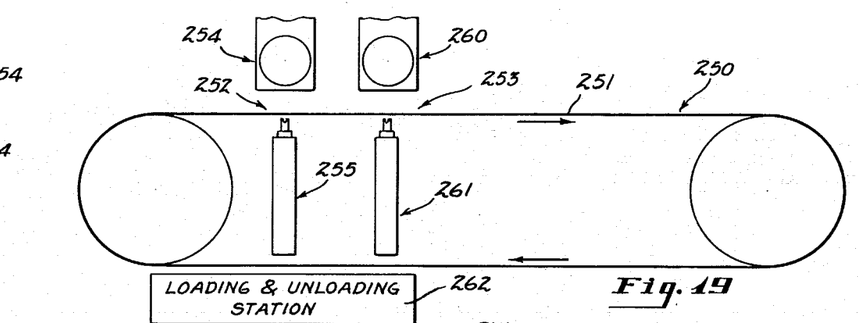
FIGURE 19 is a diagrammatical plan view of an automated production line apparatus which comprises a modified aspect of the present invention.

The first work station 252 constitutes a dipping position at which each set-up is immersed in refractory slurry. The apparatus for dipping the set-ups is generally indicated by reference numeral 254 and may be substantially the same as that described in conjunction with the preferred embodiment of the invention. As shown, a loading mechanism 255 is provided for transferring each set-up to the dipping apparatus 254 and then returning the set-ups to the conveyor after the dipping operation has been completed.

From the dipping station 252, the slurry coated set-ups are moved to the work station 253 at which the set-ups are stuccoed with a suitable refractory material. In accordance with conventional shell forming techniques, this stuccoing operation may be carried out by immersing the set-ups in a container of the stuccoing material which is continuously agitated by a stream of air to provide a fluid-like bed. The apparatus for handling the set-ups is generally indicated at 260 and may be comprised simply of a vertically reciprocal carriage similar to the previously described carriage 32 which is mounted on a guide frame and which is provided with a fixture, as will hereinafter be described, for holding the set-ups. A loading mechanism 261, which is similar to the mechanism 255, is provided for transferring the set-ups between the conveyor and the holding fixture of the stuccoing apparatus 260.

The conveyor 251 is of sufficient length to allow the slurry coatings on the patterns to harden after being moved from the stuccoing station 253 and before being returned to the station 252 for the next application of slurry. If desired, this hardening of the slurry may be facilitated by forced air drying. When the shells have been built up to the desired thickness by repeated dipping, stuccoing and drying of the set-ups, the molds may be removed from the conveyor at a loading and unloading station 262 and new set-ups connected to the conveyor.

Figures 20, 21, 22:
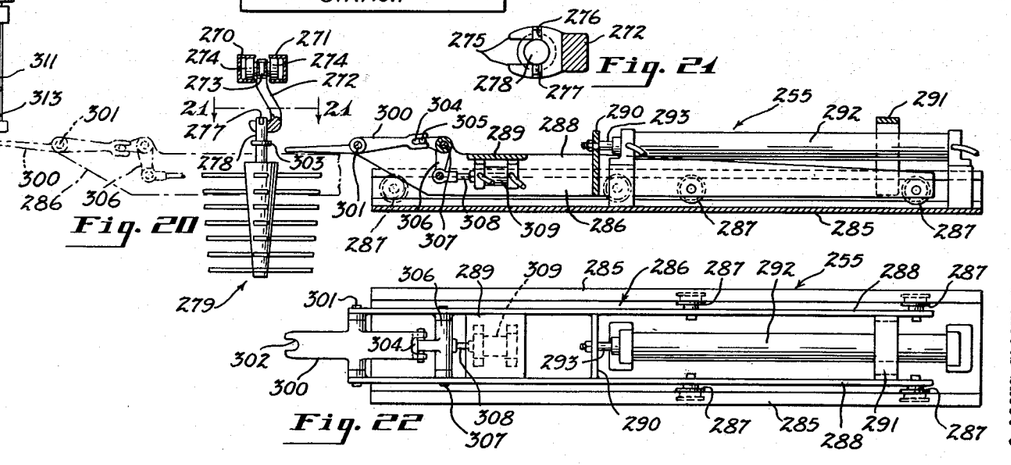
FIGURE 20 is a diagrammatical side elevational view, partially in cross-section, of a portion of the apparatus illustrated in FIG. 19.
FIGURE 21 is a fragmentary, cross-sectional view taken on the line 21—21 of FIG. 20.
FIGURE 22 is a plan view of a portion of the apparatus shown in FIG. 20.

Reference is now made to FIGS. 20, 21 and 22 which illustrate the apparatus 250 in more detail. According to this embodiment, the conveyor 251 is a typical trolley-type conveyor and comprises spaced rails 270 and 271 along which are mounted traveling hooks 272 (only one of which is shown). These hooks are connected in spaced relationship by a conveyor chain 273 and are provided with rollers 274 which rollingly engage the rails 270, 271. As shown most clearly in FIG. 21, each hook 272 preferably has a bifurcated end 275 which includes a transverse slot 276. This slot 276 is adapted to receive a cross-pin 277 which is connected to the end of the rod 278 of each set-up 279. In this manner, the set-ups can be easily connected to the hooks 272 for movement by the conveyor.

The loading mechanism 255 which is associated with the dipping apparatus 254 includes a stationary frame channel 285 supported by suitable structural members (not shown). A carriage 286 is mounted for movement along the frame channel 285 by rollers 287. As shown, the carriage 286 is formed by side plates 288 which are transversely connected by plates 289, 290 and 291. Movement is imparted to the carriage 286 by a fluid cylinder mechanism 292 which is secured to the fixed channel 285. The piston rod 293 of the cylinder mechanism 292 is connected to the transverse plate 290 of the carriage.

At the front end of the carriage 286, there is provided a transfer mechanism for engaging the pattern set-ups. This transfer mechanism is shown to comprise a lever arm 300 which is journaled intermediate its ends on a pivot shaft 201 mounted between the carriage side plates 288. The forward end of the lever arm 300 has a recess 302 which is adapted to receive the rod 278 of each set-up 279 so that the arm may liftingly engage a collar 303 on the rod.

The opposite end of the lever arm 300 is bifurcated and a transverse slot 304 is formed in each leg. These slots 304 are adapted to receive oppositely extending lugs 305 on one arm of a bell crank 306. The bell crank 306 is fulcrumed on a shaft 307 connected between the carriage side plates 288, and its other arm is pivotally connected to the piston rod 308 of a fluid cylinder mechanism 309. As shown, the fluid cylinder mechanism 309 is secured to the underside of the carriage plate 289 so that operation of the cylinder mechanism serves to pivot the lever arm 300 on the horizontal shaft 307.

In operation, the conveyor 251 is actuated to position a set-up 279 adjacent the dipping apparatus 254. Thereupon the fluid cylinder mechanism 292 of the loading mechanism is actuated to move the carriage 286 to the left (as viewed in FIG. 20) until the rod 278 is engaged in the recess 302 of the lever arm 300. The movement of the carriage is momentarily stopped in this position and the fluid cylinder mechanism 309 is retracted so that the lever arm 300 is caused to pivot and lift the cross-pin 277 of the rod 278 from engagement with the hook 272. Movement of the carriage 286 may then be continued to transfer the set-up 279 adjacent the fixture 310 of the apparatus 254.

The fixture 310 differs from the fixture 52 of the preferred embodiment of the invention and comprises a shaft 311 having a head 312 which is formed with a slot 313 for receiving the cross-pin 277. The shaft 311 is operatively connected to the spin motor 49 by a magnetic one-point clutch 314. This clutch operates to return the shaft 311 to the same position after each spin cycle so that the head 312 is in position to receive the cross-pin 277. As noted above, the fixture of the stuccoing apparatus 260 preferably corresponds to the fixture 310.

When the set-up 279 has been positioned adjacent the fixture 310, the fluid cylinder mechanism is extended to lower the set-up until the cross-pin 277 is seated in the slot 313. Thereupon the carriage 286 is withdrawn and the apparatus 254 is operated in the manner described in conjunction with the preferred embodiment of the invention to slurry coat the set-up 279.

At the end of the dipping operation, the carriage 286 again is extended and the cylinder mechanism 309 operated to pivot the arm 300 in lifting engagement with the set-up. By returning the carriage and reversing the movement of the cylinder mechanism 309, the set-up can be replaced on the conveyor hook 272 for movement to the stuccoing station 253. It will be understood that the loading mechanism 261 at the stuccoing station is operable in the same manner as the mechanism 255 to engage the coated set-up on the fixture of the stuccoing apparatus 260 and then return the set-up to the conveyor for the drying cycle.

Many modifications and variations of the invention will be apparent to those skilled in the art in view of the foregoing detailed description. Therefore, it is to be understood that, within the scope of the appended claims, the invention can be practiced otherwise than as specifically disclosed.

What is claimed is:

1. An apparatus for forming ceramic shell molds comprising a slurry tank, a vertically reciprocal carriage mounted above said tank, said carriage including a work holding fixture rotatable about a vertical axis and a cover for said tank, actuating means connected to said carriage for moving said fixture into said tank and placing said cover in sealed engagement therewith, removing said fixture from said tank and rotating said fixture, and means connected to said tank for producing a vacuum when said cover has been moved into sealed engagement therewith.

2. The apparatus as claimed in claim 1 including a slurry reservoir tank, conduit means connecting said reservoir tank to said slurry tank, pump means connected in said conduit means for circulating slurry through said slurry tank, and valve means disposed in said conduit means for closing said conduit means when the vacuum is produced in said slurry tank.

3. An apparatus for forming ceramic shell molds by dip-coating a pattern set-up in a refractory slurry, said apparatus comprising a slurry tank, a frame, a vertically reciprocal carriage mounted on said frame above said tank, said carriage including a cover adapted to be placed in air-tight sealed engagement with said tank by downward movement of said carriage, a fixture depending from said cover for holding a pattern set-up in position to be immersed in refractory slurry in said slurry tank, a vacuum line connected to said tank so that a vacuum can be produced when said tank has been closed by said cover, and means for reciprocating said carriage.

4. The apparatus claimed in claim 3 including a vacuum valve disposed in said vacuum line, said valve being operative in one position to open said line for the production of a vacuum in said tank and being operative in another position to admit ambient air to said tank.

5. The apparatus as claimed in claim 4 including control means for operating said vacuum valve, said control means comprising a limit switch operatively connected between said carriage and said frame for causing said valve to be placed in said one position when said tank has been closed, vacuum timer means for holding the vacuum in said tank for a predetermined vacuum period, and means in circuit relation with said timer for placing said valve in said another position after said vacuum period.

6. An apparatus for forming ceramic shell molds comprising a slurry tank, a vertically reciprocal carriage carriage mounted above said tank, said carriage including a work-holding fixture rotatable about a vertical axis, said carriage being vertically movable between a first position in which an article carried by said fixture is immersed in a slurry within said tank and a second position above said first position in which the article is above the slurry, actuating means connected to said carriage for moving it between said positions, a motor operably connected to said fixture for rotating it at a speed sufficient to spin off excess slurry from the article on said fixture while said carriage is held in said second position.

7. The apparatus as claimed in claim 6 including control means for operating said motor and said actuating means, said control means comprising a limit switch positioned in the path of travel of said carriage to stop said actuating means during upward movement of said carriage, a dwell timer in circuit relation with said limit switch for holding said carriage stationary for a predetermined dwell period, and a spin timer in circuit relation with said motor and said dwell timer for actuating said motor for a predetermined spin period at the end of said dwell period.

8. An apparatus for forming ceramic shell molds by dip-coating a pattern set-up in a refractory slurry, said apparatus comprising a slurry tank, a vacuum line connected to said slurry tank, valve means in said vacuum line, said valve means being operable in one position to permit a vacuum to be produced in said tank and in another position to admit ambient air to said slurry tank, a slurry reservoir tank, conduit means connected to said slurry tank and to said slurry reservoir tanks, pump means in said conduit means for circulating slurry through said slurry tank, slurry shut-off means in said conduit means for isolating said slurry tank from said reservoir tank when said valve means is in said one position, a frame, a vertically reciprocal carriage mounted on said frame above said slurry tank, said carriage including a cover for said slurry tank and a fixture for holding a pattern set-up, said fixture being rotatable about an axis parallel to the path of movement of said carriage, a motor on said carriage in rotatable connection with said fixture, and actuating means for reciprocating said carriage and selectively operating said motor.

9. An apparatus for use in coating articles, said apparatus comprising:
 (a) a vertically reciprocable carriage including spaced, vertical carriage members,
 (b) a frame supporting said carriage, said frame including spaced, vertical channel members at the sides of said carriage and adjacent said carriage members,
 (c) rollers connected to one of the members at each side of said carriage and engaged with the adjacent member,
 (d) means connected between said members at each side of said carriage for preventing lateral movement of said carriage,
 (e) a horizontal tank cover secured to said carriage,
 (f) a motor mounted on said cover, (g) a vertical shaft extending through said cover, said motor being drivingly connected to said shaft,
(h) an article-holding fixture connected to the bottom of said shaft,
(i) a main tank disposed below said carriage in position to be closed by said cover,
(j) carriage actuating means connected between said carriage and said frame, said actuating means including means for producing smooth, accurate movement of said carriage, and
(k) control means for operating said motor and said actuating means, said control means including a start switch for initiating said actuating means to move said carriage downwardly until said main tank is closed by said cover, means for initiating said actuating means to move said carriage upwardly, a limit switch connected between said carriage and said frame in position to stop said actuating means during upward movement of said carriage, a dwell timer in circuit relation with said limit switch for holding said carriage stationary for a predetermined dwell period, and a spin timer in circuit relation with said motor and said dwell timer for actuating said motor for a predetermined spin period at the end of said dwell period.

10. The apparatus as claimed in claim 9, including:
(l) a reservoir tank,
(m) an inlet conduit connected between said reservoir tank and said main tank,
(n) a first pump in said inlet conduit for pumping material from said reservoir tank to said main tank,
(o) a first valve in said inlet conduit for controlling the flow of material,
(p) an overflow conduit connected between said main tank and said reservoir tank,
(q) a second pump in said overflow conduit for pumping material to said reservoir tank,
(r) a second valve in said overflow conduit for controlling the flow of material,
(s) a drain conduit connected between said reservoir tank and said second pump, and
(t) a third valve in said drain conduit.

11. The apparatus as claimed in claim 10 including:
(u) a vacuum line connected to said main tank,
(v) a vacuum valve in said vacuum line, said valve being operative in one position to permit a vacuum to be produced in said main tank and being operative in another position to admit ambient air through said vacuum line into said main tank,
(w) limit switch means connected between said carriage and said frame for closing the conduit valves and causing said vacuum valve to be placed in said one position after the said main tank has been closed,
(x) a vacuum timer means for holding the vacuum in said main tank for a predetermined vacuum period, and
(y) means in circuit relation with said vacuum timer means for placing said vacuum valve in said another position after the vacuum period.

12. An apparatus adapted for use in forming a ceramic shell mold by the steps including dipping a pattern set-up into a refractory slurry, removing the pattern set-up from the slurry, directionally draining excess slurry from the pattern set-up without disturbing the slurry within internal cavities and recesses of the patterns, and then spinning the pattern set-up around an axis thereof so as to throw off excess slurry and obtain a mold wall of substantially uniform thickness, said apparatus comprising a tank, a frame, reciprocal carriage means mounted on said frame adjacent said tank, said carriage means including a fixture for holding a pattern set-up so that it can be immersed in refractory slurry in said tank by movement of said carriage means toward said tank, said fixture being rotatable so as to spin the pattern set-up about an axis thereof, a motor in operative connection with said fixture for producing rotation thereof, a cover for said tank, said cover being engagable with said tank in air-tight sealed relationship, means connected to said tank for producing a vacuum therein when said cover is in sealed engagement with said tank, actuating means for reciprocating said carriage means, and control means for said apparatus, said control means being operable to permit vacuum to be produced in said tank when it has been closed and to hold the vacuum in said tank for a predetermined vacuum period, thereafter to initiate said actuating means to move said carriage means upwardly after the vacuum period and to stop said actuating means during upward movement of said carriage means for a dwell period sufficient to allow directional draining of the pattern set-up without disturbing the slurry within internal cavities and recesses of the patterns, and to actuate said motor for a predetermined spin period at the end of said dwell period.

13. An apparatus adapted for use in forming a ceramic shell mold by the steps including dipping a pattern set-up into a refractory slurry, removing the pattern set-up from the slurry, draining excess slurry from the pattern set-up, and then spinning the pattern set-up about an axis thereof so as to throw off excess slurry and obtain a mold wall of substantially uniform thickness, said apparatus comprising structure having a first portion for retaining a refractory slurry bath and a second portion in which a slurry coated pattern set-up can be spun to throw off the slurry and the excess slurry caught and returned to the bath, carriage means, said carriage means including work-holding fixture means rotatable about a vertical axis, said fixture means including means for suspending a pattern set-up so that it can be spun about an axis thereof, means mounting said carriage means and said first portion of said structure for relative movement toward and away from each other, said carriage means and said first portion of said structure being relatively movable between a first position in which the pattern set-up carried by said fixture means is immersed in the slurry bath within said first portion and a second position in which the pattern set-up is withdrawn from the slurry bath and is within said second portion of said structure, actuating means for producing said relative movement, motor means connected to said fixture means for rotating it at a speed sufficient to spin off excess slurry from the pattern set-up after it has been coated with slurry, and means for operating said motor means in said second position.

14. The apparatus as claimed in claim 13 wherein said structure comprises a single tank.

References Cited by the Examiner
UNITED STATES PATENTS

| | | | |
|---|---|---|---|
| 1,287,074 | 12/1918 | Moore | 118—50 |
| 1,325,004 | 12/1919 | Davidson | 22—190.1 X |
| 1,818,976 | 8/1931 | Goff | 118—50 |
| 2,241,176 | 5/1941 | Boecler et al. | 18—24 |
| 2,297,459 | 9/1942 | Dichter | 18—24 |
| 2,416,506 | 2/1947 | Vest | 22—9 |
| 2,617,163 | 11/1952 | Jeter et al. | 22—192 |
| 2,653,361 | 9/1953 | Pellergrini | 22—9 |
| 2,696,022 | 12/1954 | Steinbock et al. | 22—190.1 X |
| 2,763,042 | 9/1956 | Zupez | 22—123 |
| 2,844,489 | 7/1958 | Gemmer | 18—24 |
| 2,853,084 | 9/1958 | Lipshaw | 118—416 |
| 2,858,795 | 11/1958 | Walker | 118—50 |
| 2,862,236 | 12/1958 | Shapero | 18—24 |
| 2,932,864 | 4/1960 | Mellen et al. | 22—87 |
| 2,983,970 | 5/1961 | Ford et al. | 22—20 |
| 3,029,482 | 4/1962 | Burnett | 22—20 |

MARCUS U. LYONS, *Primary Examiner.*

MICHAEL V. BRINDISI, *Examiner.*